(12) United States Patent
Choi

(10) Patent No.: US 12,133,010 B2
(45) Date of Patent: Oct. 29, 2024

(54) IMAGE SENSOR AND OPERATING METHOD THEREOF

(71) Applicant: SK hynix Inc., Icheon-si (KR)

(72) Inventor: Joeng Ik Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 26 days.

(21) Appl. No.: 18/087,402

(22) Filed: Dec. 22, 2022

(65) Prior Publication Data

US 2024/0022840 A1 Jan. 18, 2024

(30) Foreign Application Priority Data

Jul. 15, 2022 (KR) .................. 10-2022-0087688

(51) Int. Cl.
*H04N 25/771* (2023.01)
*H04N 25/60* (2023.01)

(52) U.S. Cl.
CPC ........... *H04N 25/771* (2023.01); *H04N 25/60* (2023.01)

(58) Field of Classification Search
CPC .... H04N 25/771; H04N 25/60; H04N 25/709; H04N 25/69; H04N 25/76; H04N 25/745; H04N 25/7795; H04N 25/77
See application file for complete search history.

(56) References Cited

U.S. PATENT DOCUMENTS

| | | | |
|---|---|---|---|
| 2006/0001754 A1* | 1/2006 | Yanagisawa | H04N 25/616 348/E5.079 |
| 2007/0008420 A1* | 1/2007 | Roh | H04N 25/779 348/308 |
| 2009/0256940 A1* | 10/2009 | Pahr | H04N 25/709 257/E21.616 |
| 2015/0109500 A1* | 4/2015 | Wang | H04N 25/745 348/294 |
| 2016/0050381 A1* | 2/2016 | Onishi | H04N 25/57 348/300 |
| 2016/0248996 A1* | 8/2016 | Jo | H04N 25/00 |
| 2017/0054926 A1* | 2/2017 | Kikuchi | H03F 3/45183 |
| 2018/0077368 A1* | 3/2018 | Suzuki | H04N 25/709 |

(Continued)

FOREIGN PATENT DOCUMENTS

| | | |
|---|---|---|
| KR | 1020120016570 A | 2/2012 |
| KR | 101750240 B1 | 7/2017 |

*Primary Examiner* — Albert H Cutler
(74) *Attorney, Agent, or Firm* — WILLIAM PARK & ASSOCIATES LTD.

(57) ABSTRACT

An image sensor includes: a controller; a comparator configured to generate a comparison signal, the comparator comprising a first capacitor that samples a control voltage and a second capacitor which samples a reference voltage, a first switch that adjusts a voltage that is applied to the first capacitor, a second switch that adjusts a voltage that is applied to the second capacitor, a first feedback switch that connects a first output terminal of the comparator to a first input terminal of the comparator, and a second feedback switch that connects a second output terminal of the comparator to a second input terminal of the comparator; and a voltage generator for boosting the control voltage based on the comparison signal. The comparator generates a comparison signal by comparing a voltage of the first capacitor and a voltage of the second capacitor. The controller stores a feedback voltage corresponding to an offset voltage of the comparator.

21 Claims, 7 Drawing Sheets

(56) References Cited

U.S. PATENT DOCUMENTS

2019/0124284 A1* 4/2019 Kim ................. H04N 25/76
2021/0058576 A1* 2/2021 Gurindagunta ........ H04N 25/75
2021/0202548 A1* 7/2021 Park .................... H04N 23/959

* cited by examiner

IMAGE SENSOR AND OPERATING METHOD THEREOF

CROSS-REFERENCE TO RELATED APPLICATION

The present application claims priority under 35 U.S.C. § 119(a) to Korean patent application number 10-2022-0087688, filed on Jul. 15, 2022, in the Korean Intellectual Property Office, the entire disclosure of which is incorporated herein by reference.

BACKGROUND

1. Technical Field

The present disclosure generally relates to an image sensor, and more particularly, to an image sensor and an operating method thereof.

2. Related Art

An image sensor may be generally divided into a Charge Coupled Device (CCD) image sensor and a Complementary Metal Oxide Semiconductor (CMOS) image sensor. Recently, the CMOS image sensor, which has low manufacturing cost, low power consumption, and easy integration with a peripheral circuit, has received much attention.

The image sensor may include a pixel array including a plurality of pixels. Each of the plurality of pixels may include transistors. A voltage generator may generate control voltages and may transmit the generated control voltages to the transistors. However, when the accuracy of the control voltages is low, the transistors may malfunction.

For example, the linearity of an output signal of the pixels may be degraded, or noise may be included in the output signal. By applying inaccurate control voltages, current leakage may occur in the pixels, or the output signal of the pixels may become unreliable.

The voltage generator may boost a control voltage that is supplied to the pixel by comparing the control voltage with a reference voltage. In order to increase the accuracy of the control voltages supplied to the pixels, it is necessary to minimize influence of an offset voltage of a voltage comparator.

SUMMARY

In accordance with an aspect of the present disclosure, there is provided an image sensor including: a controller, a comparator configured to generate a comparison signal, the comparator comprising: a first capacitor that samples a control voltage for controlling a pixel, a second capacitor that samples a reference voltage corresponding to the control voltage, a first switch that adjusts a voltage that is applied to the first capacitor, a second switch that adjusts a voltage that is applied to the second capacitor, a first feedback switch which connects a first output terminal of the comparator to a first input terminal of the comparator, and a second feedback switch which connects a second output terminal of the comparator to a second input terminal of the comparator; and a voltage generator configured to boost the control voltage based on the comparison signal, wherein the comparator is configured to generate a comparison signal by comparing a voltage of the first capacitor and a voltage of the second capacitor, and wherein the controller is configured to control the first switch and the second switch to apply a ground voltage to the first capacitor and the second capacitor, turn on the first feedback switch and the second feedback switch, and store a feedback voltage corresponding to an offset voltage of the comparator in the first capacitor and the second capacitor.

In accordance with another aspect of the present disclosure, there is provided a comparator including: a capacitor set configured to sample a control voltage for controlling a pixel and a predetermined reference voltage, an amplifier configured to generate a comparison signal by comparing the voltages that are sampled by the capacitor set; and a switch set configured to adjust voltages that are applied to the capacitor set and control feedback of the amplifier, wherein the capacitor set is configured to store a feedback voltage corresponding to an offset voltage of the amplifier during a first period in which the comparison signal of the amplifier is fed back and configured to add up the feedback voltage and the offset voltage during a second period in which the control voltage and the reference voltage are applied to the amplifier.

In accordance with still another aspect of the present disclosure, there is provided a method of operating an image sensor, the method including: storing a feedback voltage corresponding to an offset voltage of a comparator in a first capacitor that samples a control voltage for controlling a pixel and a second capacitor that samples a reference voltage corresponding to the control voltage; adding up the offset voltage and the feedback voltage, corresponding to an input of the control voltage and the reference voltage; generating a comparison signal based on a difference between the control voltage and the reference voltage and a sum of the feedback voltage and the offset voltage; and boosting the control voltage based on the comparison signal.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, exemplary embodiments of the present disclosure will be described in detail with reference to the accompanying drawings in order for those skilled in the art to be able to readily implement the technical spirit of the present disclosure.

Embodiments provide an image sensor and an operating method thereof, which can improve the accuracy of a comparison signal by reducing influence of an offset voltage of a comparator and boost a control voltage based on the comparison signal.

Figure 1:
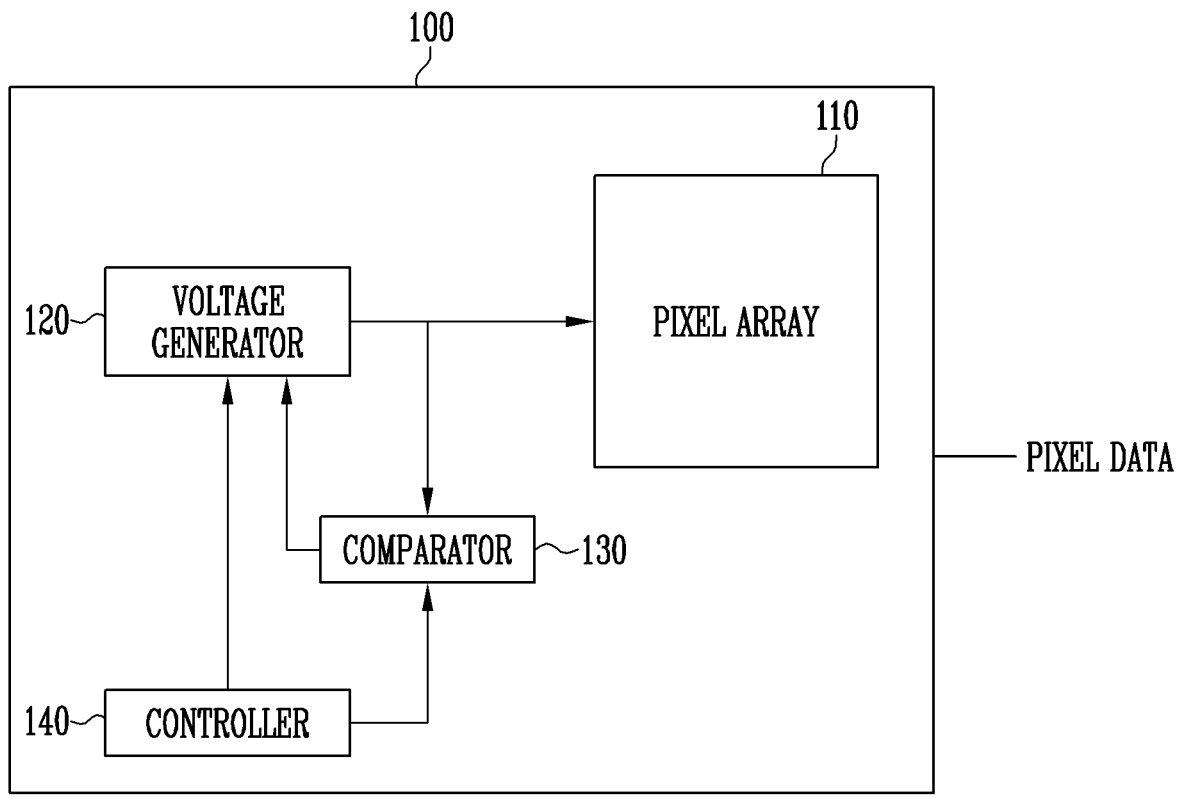
FIG. 1 is a diagram illustrating an image sensor in accordance with an embodiment of the present disclosure.

FIG. 1 is a diagram illustrating an image sensor in accordance with an embodiment of the present disclosure.

Referring to FIG. 1, the image sensor 100 may include a pixel array 110, a voltage generator 120, a comparator 130, and a controller 140. The image sensor 100 may generate pixel data based on a control voltage that is generated in the voltage generator 120.

The pixel array 110 may include a plurality of pixels for outputting optical information of incident light. Specifically, each of the plurality of pixels may accumulate photocharges that are generated according to incident light and may generate a pixel signal corresponding to the accumulated photocharges. Each of the pixels may include a photoelectric conversion element (e.g., a photo diode, a photo transistor, a photogate, or a pinned photo diode) for converting an optical signal into an electrical signal and at least one transistor for processing an electrical signal. In an embodiment of the present disclosure, each of the pixels may include a transmission transistor, a reset transistor, and a select transistor.

The voltage generator 120 may generate control voltages that are applied to the pixels. The voltage generator 120 may transfer control voltages to transistors included in each of the pixels. The control voltages that are transferred to the respective transistors may be different from each other.

The comparator 130 may generate a comparison signal by comparing a control voltage that is generated in the voltage generator 120 with a reference voltage. The comparator 130 may include an internal amplifier and a capacitor set that samples a control voltage for controlling a pixel and a reference voltage corresponding to the control voltage. In an embodiment of the present disclosure, an offset voltage may be included in the comparator 130 by the internal amplifier. The offset voltage may decrease the accuracy of the comparison signal.

In an embodiment of the present disclosure, the comparator 130 may include switches that adjust a voltage that is applied to the capacitor set and feedback switches that control the feedback of the comparison signal.

The controller 140 may generate a control signal for controlling operations of the voltage generator 120 and the comparator 130. The controller 140 may control the switches and the feedback switches, which are included in the comparator 130. The controller 140 may reduce the influence of the offset voltage of the comparator 130, which is included in the comparison signal.

The comparator 130 may generate a comparison signal based on the control voltage, the reference voltage, a feedback voltage, and the offset voltage. The comparator 130 may reduce the influence of the offset voltage of the comparator 130 in the comparison signal based on a sum of the feedback voltage and the offset voltage. The comparator 130 may generate a comparison signal in which the influence of the offset voltage is reduced by a gain ratio of the comparator 130.

In an embodiment of the present disclosure, the voltage generator 120 may boost the control voltage based on the comparison signal. The voltage generator 120 may increase the control voltage for a boosting time. The voltage generator 120 may further increase the control voltage as the boosting time becomes longer.

Figure 2:
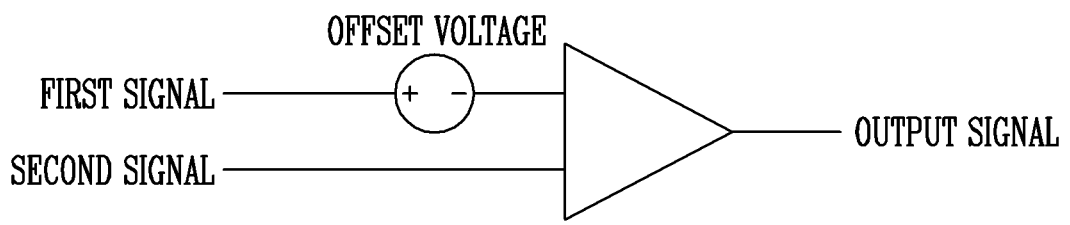
FIG. 2 is a block diagram illustrating an offset voltage of a comparator.

FIG. 2 is a block diagram illustrating an offset voltage of a comparator.

Referring to FIG. 2, the comparator may generate an output signal by amplifying a difference between a first signal and a second signal. The comparator may include an internal amplifier and an offset voltage. The accuracy of the output signal may be lowered by the offset voltage included in the comparator.

Theoretically, the comparator may output an output signal by amplifying a difference between a first signal and a second signal. An error may be included in the output signal based on the offset voltage included in the comparator. The accuracy of the output signal can be improved by decreasing the influence of the offset voltage on the output signal.

In an embodiment of the present disclosure, the comparator 130 may generate a comparison signal indicating a boosting degree of a control voltage, corresponding to a change in control voltage that is generated in the voltage generator 120. Pixels may malfunction due to influence on an offset voltage included in the comparison signal. For example, reset levels of reset pixels may be different from each other for each pixel. Charges may remain in transistors included in the pixels even after a reset operation. The linearity of pixel output may be decreased. Noise is included in the pixel output, and therefore, reliability may be deteriorated. A dark current may be generated inside the pixels.

In order to improve the accuracy of the comparison signal, a method of reducing the influence of the offset voltage of the comparator in the comparison signal may be required. In an embodiment of the present disclosure, the controller may temporarily store a feedback voltage corresponding to the offset voltage inside the comparator so that the influence of the offset voltage included in the comparison signal can be reduced.

Figure 3:
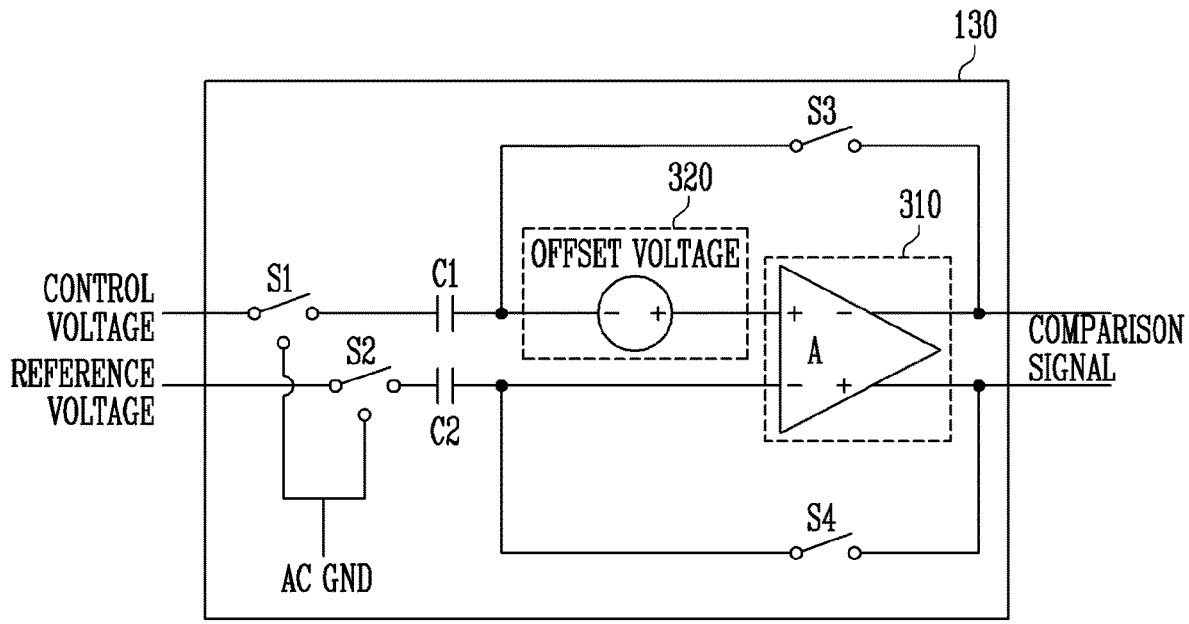
FIG. 3 is a circuit diagram illustrating a comparator which generates a comparison signal in which influence of an offset voltage is reduced in accordance with an embodiment of the present disclosure.

FIG. 3 is a circuit diagram illustrating a comparator which generates a comparison signal in which influence of an offset voltage is reduced in accordance with an embodiment of the present disclosure.

Referring to FIG. 3, the comparator 130 may output a comparison signal by comparing a difference between a control voltage and a reference voltage. The comparator 130 may include an offset voltage 320 and an internal amplifier 310 having a gain of A. A first switch S1 may transfer the control voltage or a ground voltage to a first capacitor C1. The first capacitor C1 may be connected to the offset voltage 320, and the offset voltage 320 may be connected to a positive input terminal of the internal amplifier 310. A second switch S2 may transfer the reference voltage or the ground voltage to a second capacitor C2. The second capacitor C2 may be connected to a negative input terminal of the internal amplifier 310. The internal amplifier 310 may output the comparison signal through a negative output terminal and a positive output terminal. A first feedback switch S3 may connect a node between the first capacitor C1 and the offset voltage 320 to the negative output terminal of the internal amplifier 310. A second feedback switch S4 may connect a node between the second capacitor C2 and the negative input terminal of the internal amplifier 310 to the positive output terminal of the internal amplifier 310.

In an embodiment of the present disclosure, the controller 140 may control the first switch S1, the second switch S2, the first feedback switch S3, and the second feedback switch S4. The controller 140 may store a feedback voltage corresponding to the offset voltage 320 of the comparator 130 in the first capacitor C1 and the second capacitor C2 by transmitting a control signal to the switches included in the comparator 130. The controller 140 may reduce the influence of the offset voltage 320 included in the comparison signal by adding up the offset voltage 320 and the feedback voltage.

The controller 140 may control the first switch S1 and the second switch S2 to apply the ground voltage to the first capacitor C1 and the second capacitor C2. The internal amplifier 310 may output a feedback voltage corresponding to the offset voltage 320 through an output terminal of the comparator 130. The controller 140 may turn on the first feedback switch S3 and the second feedback switch S4. The feedback voltage may be applied to the first capacitor C1 and the second capacitor C2. The first capacitor C1 and the second capacitor C2 may sample and store the feedback voltage. In an embodiment of the present disclosure, a period in which the ground voltage is applied to the first capacitor C1 and the second capacitor C2, and the first feedback switch S3 and the second feedback switch S4 are turned on so that the comparison signal is fed back may be referred to as a first period.

The controller 140 may control the first switch S1 such that the control voltage is applied to the first capacitor C1 and may control the second switch S2 such that the reference voltage is applied to the second capacitor C2. The control voltage, the reference voltage, the feedback voltage, and the offset voltage 320 may be input through the input terminal of the internal amplifier 310. The feedback voltage and the offset voltage 320 may be added up. The controller 140 may turn off the first feedback switch S3 and the second feedback switch S4. In an embodiment of the present disclosure, a period in which the control voltage is applied to the first capacitor C1, the reference voltage is applied to the second capacitor C2, and the first feedback switch S3 and the second feedback switch S4 are turned off so that the comparison signal is not fed back may be referred to as a second period.

In an embodiment of the present disclosure, a magnitude of the feedback voltage may be A/(A+1) times a magnitude of the offset voltage 320. A potential direction of the feedback voltage and a potential direction of the offset voltage 320 may be opposite to each other. A sum of the feedback voltage and the offset voltage 320 may be offset voltage/(A+1). The sum of the feedback voltage and the offset voltage 320 may be added up with the difference between the control voltage and the reference voltage to be input to the internal amplifier 310. The comparison signal of the comparator 130 is expressed as an equation as follows.

Comparison signal=$A*[Vos/(1+A)$+reference voltage−control voltage]

Here, Vos is the offset voltage 320.

In an embodiment of the present disclosure, the influence of the offset voltage 320 included in the comparison signal may be Vos/(1+A). The gain A of the comparator 130 may be a value considerably greater than 1. The influence of the offset voltage 320 included in the comparison signal may become Vos/A. The controller 140 may reduce the influence of the offset voltage 320 in the comparison signal by a gain A ratio of the comparator 130.

Figure 4:
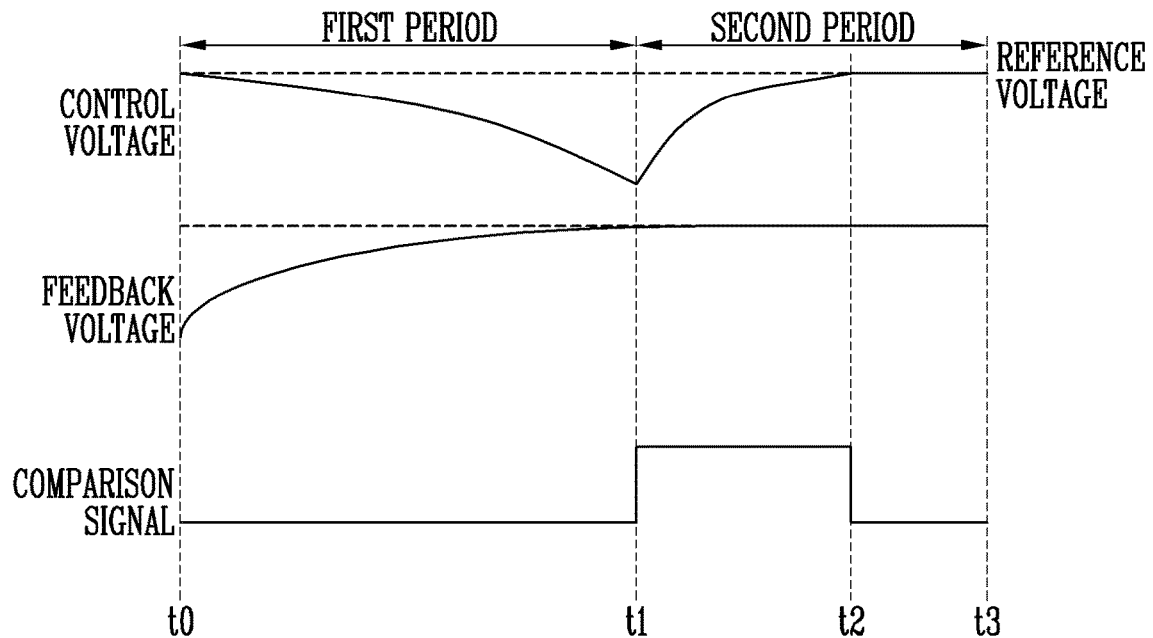
FIG. 4 is a timing diagram illustrating signals corresponding to the circuit diagram shown in FIG. 3.

FIG. 4 is a timing diagram illustrating signals corresponding to the circuit diagram shown in FIG. 3.

Referring to FIG. 4, a control voltage, a feedback voltage, and a comparison signal, which are changed according to time, may be illustrated. A reference voltage may be constantly maintained. A first period may be a period between time t0 to time t1. In an embodiment of the present disclosure, a feedback voltage corresponding to the offset voltage of the comparator may be stored in the first capacitor and the second capacitor during the first period. A second period may be a period between time t1 to time t3. In an embodiment of the present disclosure, a comparison signal by comparing a difference between the control voltage and the reference voltage may be output during the second period.

After the control voltage is input to a pixel, a voltage level of the control voltage may be changed. The control voltage may be decreased during the first period. The ground voltage may be applied to the comparator during the first period. The comparison signal may be fed back during the first period. A feedback voltage corresponding to the offset voltage may be increased corresponding to the decrease in the control voltage. During the first period, the comparator may output a low value.

During the second period, the control voltage may be boosted. The control voltage may be increased until the control voltage becomes equal to the reference voltage. The control voltage and the reference voltage may be input to the comparator during the second period. The comparator may output a comparison signal by comparing the control voltage with the reference voltage. The voltage generator may increase a control signal based on the comparison signal.

In FIG. 4, the voltage generator may increase the control voltage until time t2. The control voltage may be increased from time t1 to time t2. The comparator may output a high value from time t1 to time t2. In an embodiment of the present disclosure, the high value may be referred to as a first logic value.

The comparator may output the low value after time t2 when the control voltage is the same as the reference voltage. When the control voltage reaches the reference voltage, the voltage generator may suspend a boosting operation of the control voltage.

In an embodiment of the present disclosure, a time for which the comparator maintains the first logic value may be referred to as a boosting time. The voltage generator may increase the control voltage for the boosting time. The boosting time may be determined based on the control voltage, the reference voltage, the feedback voltage, and the offset voltage, which are input to an input terminal of the comparator. The controller may increase the boosting time as the difference between the control voltage and the reference voltage becomes larger.

Figure 5:
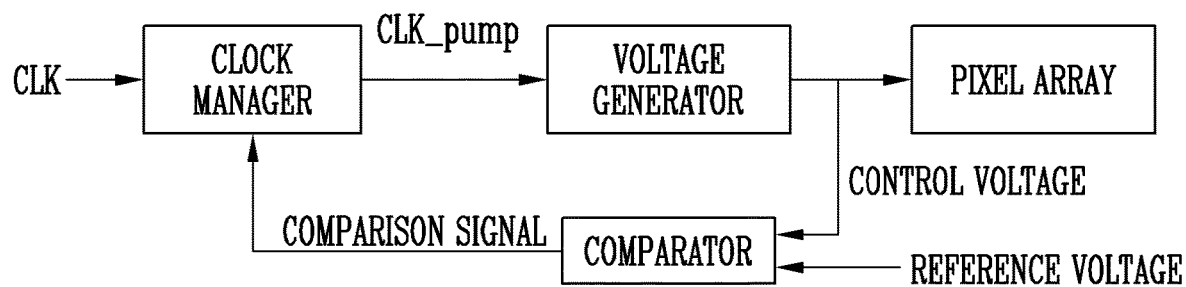
FIG. 5 is a diagram illustrating a method of boosting a control voltage in accordance with an embodiment of the present disclosure.

FIG. 5 is a diagram illustrating a method of boosting a control voltage in accordance with an embodiment of the present disclosure.

Referring to FIG. 5, the comparator may receive a control voltage from the voltage generator. The comparator may generate a comparison signal by comparing a reference voltage to the control voltage. A clock manager may transfer a pump clock signal CLK_pump to the voltage generator based on the comparison signal that is received from the comparator. The voltage generator may boost the control voltage according to the pump clock signal CLK_pump.

The clock manager may receive a clock signal CLK. The clock signal CLK may be activated only during the second period. The clock manager may transfer, to the voltage generator, a portion of the activated clock signal CLK based on the comparison signal.

The voltage generator may transfer the generated control voltage to the pixel array. The control voltage may be decreased during the first period. The control voltage may be input to the comparator. The comparator may feed a decrease degree of the control voltage back to the voltage generator by comparing the control voltage with the reference voltage. The voltage generator may be fed back with the decrease degree of the control voltage and may boost the control voltage.

The comparator may transfer, to the clock manager, a comparison signal representing the decrease degree of the control voltage. In an embodiment of the present disclosure, the comparator may include an offset voltage. The controller may reduce the influence of the offset voltage included in the comparison signal by controlling the switches included in the comparator. The controller may control the comparator to generate a comparison signal in which the influence of the offset voltage is reduced by a gain ratio of the comparator.

The clock manager may mask the clock signal CLK, corresponding to when the comparison signal is not the first logic value. The clock manager may generate a pump clock signal CLK_pump including a clock signal CLK corresponding to the boosting period. The clock manager may transfer, to the voltage generator, a pump clock signal CLK_pump obtained by masking a portion of the clock signal CLK.

The voltage generator may increase the control voltage based on the pump clock signal CLK_pump. The voltage generator may transfer the increased voltage to the pixel array. In an embodiment of the present disclosure, the comparator may feed the comparison signal back, corresponding to a change in control voltage, and the control voltage may become equal to the reference voltage based on a pump clock signal CLK_pump corresponding to the comparison signal. The accuracy of the control voltage that is supplied from the voltage generator can be improved.

Figure 6:
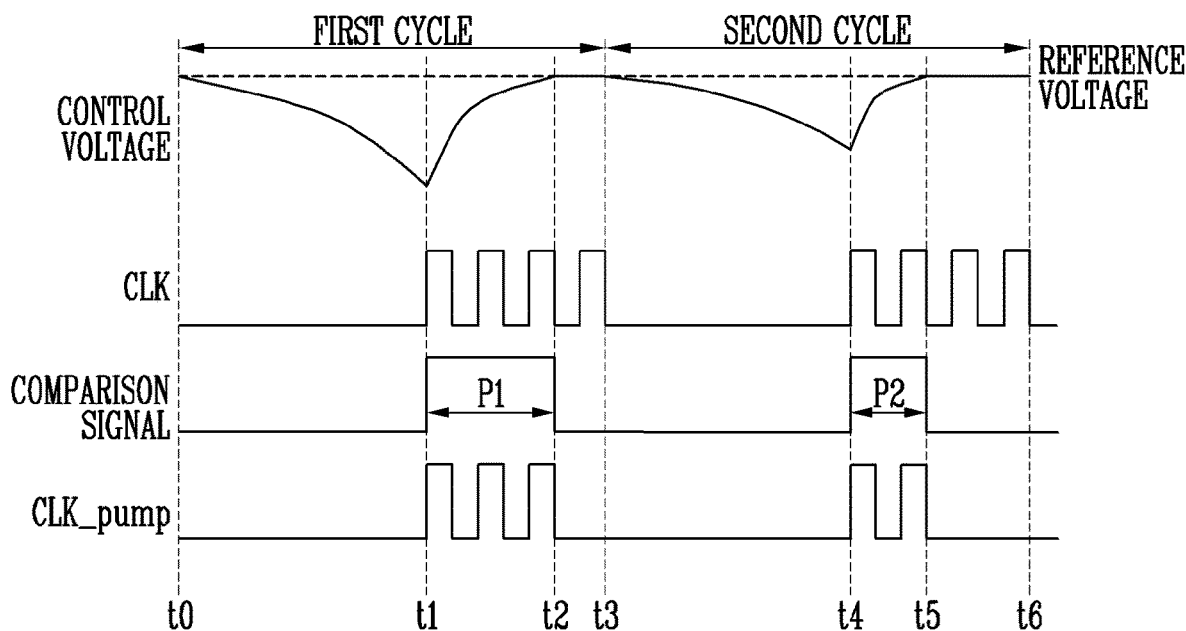
FIG. 6 is a diagram illustrating input/output control signals shown in FIG. 5.

FIG. 6 is a diagram illustrating input/output control signals shown in FIG. 5.

Referring to FIG. 6, the comparison signal and the pump clock signal CLK_pump may be illustrated corresponding to a change in the control voltage. A change degree of the control voltage in a first cycle and a change degree of the control voltage in a second cycle may be different from each other.

In the first cycle, the control voltage may be provided to the pixel array from time t0 to time t1. The ground voltage may be applied to the comparator while the control voltage is provided to the pixel array. The comparator may sample and store a feedback voltage corresponding to the offset voltage while the ground voltage is applied.

In the first cycle, the control voltage and a reference voltage may be compared from time t1 to time t3. The control voltage may be boosted while the control voltage and the reference voltage are compared. The control voltage may be constantly maintained from time t2 to time t3 in which the control voltage becomes the same as the reference voltage.

Like the first cycle, during a period corresponding to the second cycle, the offset voltage of the comparator may be sampled, and a control signal may be boosted based on a comparison signal by comparing the control voltage with the reference voltage. Unlike the first cycle, a variation of the control voltage may vary during the second cycle. Since a difference between the control voltage and the reference voltage varies, the time the comparison signal maintains the first logic value may vary. In FIG. 6, a variation of the control voltage during the first cycle may be greater than a variation of the control voltage during the second cycle. A boosting time corresponding to the first cycle may be longer than a boosting time corresponding to the second cycle.

The clock signal CLK may be activated corresponding to the second period. In FIG. 6, the clock signal CLK may be activated only between time t1 and time t3 and only between time t4 and time t6. In the cock signal CLK, four unit clock signals may be activated during the second period. The clock manager may output, as the pump clock signal CLK_pump, a clock signal corresponding to a period in which the comparison signal maintains the first logic value in the activated clock signal CLK.

In FIG. 6, a period P1 in which the comparison signal maintains the first logic value during the first cycle and a period P2 in which the comparison signal maintains the first logic value during the second cycle may be different from each other. P1 may be a period corresponding to three unit clock signals. P2 may be a period corresponding to two unit clock signals.

Since the variation of the control voltage during the first cycle is greater than the variation of the control voltage during the second cycle, the period in which the comparison signal maintains the first logic value during the first cycle may be longer than the period in which the comparison signal maintains the first logic value during the second cycle. During the first cycle, a pump clock signal CLK_pump including three unit clock signals, among the four unit clock signals, may be output. The voltage generator may increase a control voltage corresponding to the three unit clock signals.

Similarly, during the second cycle, a pump clock signal CLK_pump including two unit clock signals may be output. The voltage generator may increase the control voltage based on the two unit clock signals.

The comparison signal may maintain a second logic value after the control voltage becomes the same as the reference voltage. In an embodiment of the present disclosure, the low value may be referred to as the second logic value. The second logic value may be output as the comparison signal from time t2 to time t3 in the first cycle. The clock signal CLK may be masked while the comparison signal maintains the second logic value. The second logic value may be output as the comparison signal from time t5 to time t6 in the second cycle.

In FIG. 6, the control voltage may be boosted during the period P1 and the period P2. A boosting time may be determined based on the difference between the control voltage and the reference voltage and the sum of the feedback voltage and the offset voltage. The controller may increase the boosting time as the difference between the control voltage and the reference voltage and the sum of the feedback voltage and the offset voltage become larger.

Figure 7:
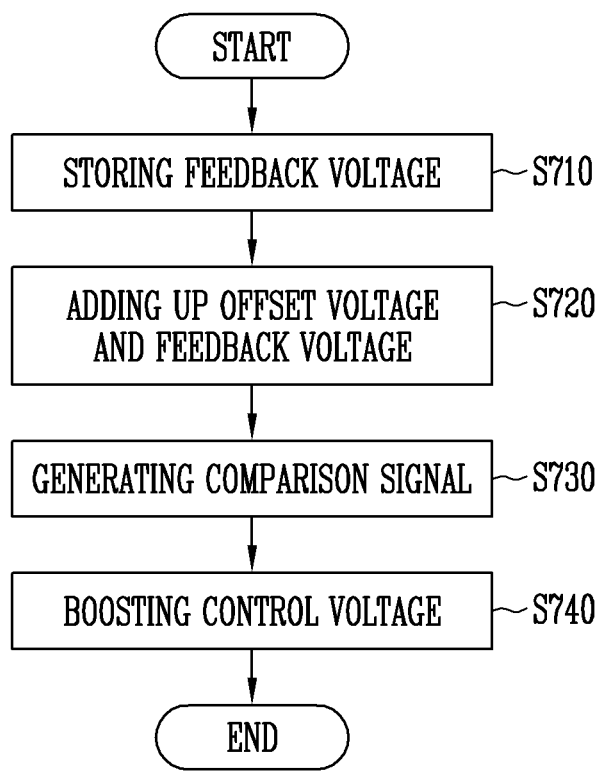
FIG. 7 is a flowchart illustrating a method of reducing influence of an offset voltage of a comparator in accordance with an embodiment of the present disclosure.

FIG. 7 is a flowchart illustrating a method of reducing influence of an offset voltage of a comparator in accordance with an embodiment of the present disclosure.

Referring to FIG. 7, the image sensor may improve the accuracy of a control voltage that is applied to a pixel. The image sensor may boost a control voltage that is generated in the voltage generator based on a comparison result that is obtained by comparing the control voltage with a reference voltage. The image sensor may store an offset voltage of the comparator before the control voltage and the reference voltage are compared so that the influence of the offset voltage that is included in a comparison signal can be reduced.

In step S710, the controller may control the comparator to store a feedback voltage corresponding to the offset voltage of the comparator in the first capacitor that samples a control voltage for controlling the pixel and the second capacitor that samples a reference voltage corresponding to the control voltage. The controller may control the comparator such that only the offset voltage is applied to the comparator. The comparator may sample the feedback voltage, and the feedback voltage may be stored in a capacitor included in the comparator.

In step S720, the comparator may add up the offset voltage and the feedback voltage, corresponding to an input of the control voltage and the reference voltage. The controller may apply the control voltage and the reference voltage to the comparator. The controller may control the comparator such that an output of the comparator is not fed back to the input terminal. A potential direction of the feedback voltage and a potential direction of the offset voltage may be different from each other. A magnitude of the sum of the feedback voltage and the offset voltage may be smaller than a magnitude of the offset voltage.

In step S730, the comparator may generate a comparison signal based on the control voltage, the reference voltage, and the sum of the offset voltage and the feedback voltage. The influence of the offset voltage may be included in the comparison signal. The controller may store the feedback voltage in the capacitor so as to reduce the influence of the offset voltage included in the comparison signal.

The feedback voltage may be stored in the first capacitor and the second capacitor, which are included in the comparator. The first capacitor may sample the control voltage, and the second capacitor may sample the reference voltage. The comparator may output a comparison signal by amplifying a difference between a voltage of the first capacitor and a voltage of the second capacitor. The difference of the voltage of the first capacitor and the voltage of the second capacitor may be a value that is obtained by adding up the sum of the feedback voltage and the offset voltage and the difference between the control voltage and the reference voltage.

In step S740, the voltage generator may boost the control voltage based on the comparison signal. The voltage generator may increase the control voltage until the control voltage is the same as the reference voltage.

The controller may determine a boosting time for which the comparison signal maintains a first logic value based on the difference between the control voltage and the reference voltage. The controller may maintain the boosting time to become longer as the difference between the control voltage and the reference voltage becomes larger.

In an embodiment of the present disclosure, the clock manager may transfer, to the voltage generator, a pump clock signal by masking a portion of an activated clock signal. The voltage generator may increase the control voltage according to a number of unit clock signals included in the pump clock signal.

Figure 8:
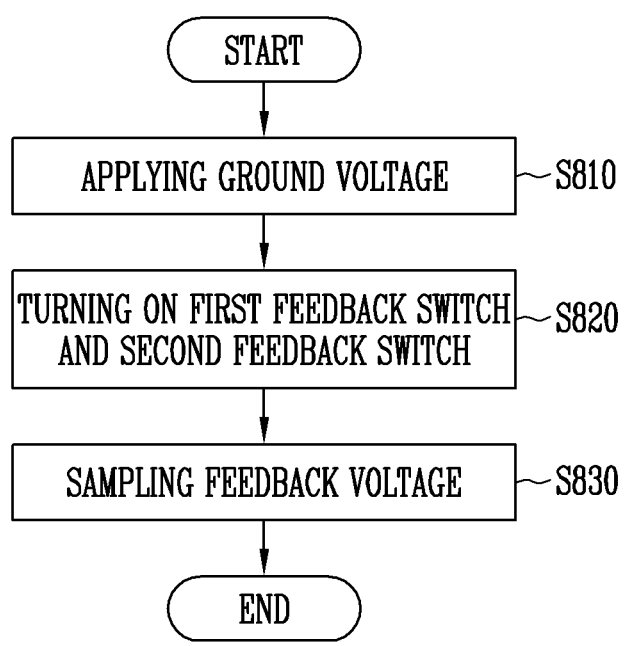
FIG. 8 is a flowchart illustrating a method of storing a feedback voltage in accordance with an embodiment of the present disclosure.

FIG. 8 is a flowchart illustrating a method of storing a feedback voltage in accordance with an embodiment of the present disclosure.

Referring to FIG. 8, the comparator may store a feedback voltage in the first capacitor that samples a control voltage and the second capacitor that samples a reference voltage. The controller may control the comparator such that only an offset voltage is applied to the input terminal of the internal amplifier.

In step S810, the controller may apply a ground voltage to the input terminal of the internal amplifier by controlling the first switch that adjusts a voltage that is applied to the first capacitor and a second switch that adjusts a voltage that is applied to the second capacitor. The first switch may be operated such that the control voltage or the ground voltage is applied to the first capacitor. The second switch may be operated such that the reference voltage or the ground voltage is applied to the second capacitor.

In step S820, the controller may turn on the first feedback switch and the second feedback switch. The first feedback switch and the second feedback switch may connect the output terminal and the input terminal of the internal amplifier to each other. A feedback voltage corresponding to the offset voltage may be applied to the first capacitor and the second capacitor.

In step S830, the first capacitor and the second capacitor may sample the feedback voltage. The feedback voltage may be added up with the control voltage or the reference voltage, which is sampled during the second period of FIG. 4. The feedback voltage may be added up with the offset voltage during the second period of FIG. 4. By adding up the feedback voltage and the offset voltage, the magnitude of the offset voltage that is input to the internal amplifier may become small. The feedback voltage that is sampled during the first period of FIG. 4 may reduce the influence of the offset voltage.

Figure 9:
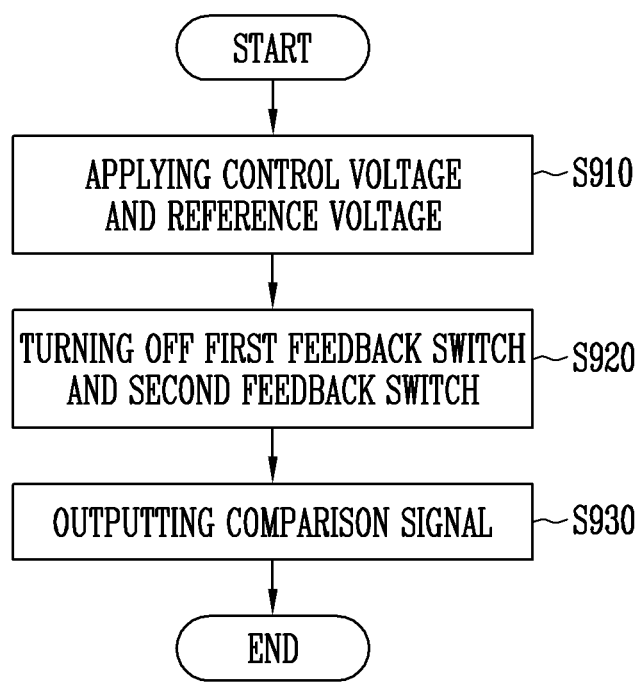
FIG. 9 is a flowchart illustrating a method of generating a comparison signal in accordance with an embodiment of the present disclosure.

FIG. 9 is a flowchart illustrating a method of generating a comparison signal in accordance with an embodiment of the present disclosure.

Referring to FIG. 9, the comparator may generate a comparison signal by comparing a control voltage with a reference voltage. The comparator may output a comparison signal based on the control voltage, the reference voltage, an offset voltage, and a feedback voltage.

In step S910, the controller may apply the control voltage to the first capacitor by controlling the first switch and may apply the reference voltage to the second capacitor by controlling the second switch. The first capacitor may sample the control voltage. The second capacitor may sample the reference voltage.

In step S920, the controller may turn off the first feedback switch and the second feedback switch. The comparison signal might not be fed back to the input terminal.

In step S930, the comparator may generate a comparison signal based on the control voltage, the reference voltage, and a result that is obtained by adding up the feedback voltage and the offset voltage. The comparator may add up the sum of the feedback voltage and the offset voltage to a difference between the control voltage and the reference voltage, and amplify, by the gain A of the internal amplifier, a result that is obtained by adding up the sum of the feedback voltage and the offset voltage to a difference between the control voltage and the reference voltage. The influence of the offset voltage included in the comparison signal may be reduced by a gain ratio of the comparator.

Figure 10:
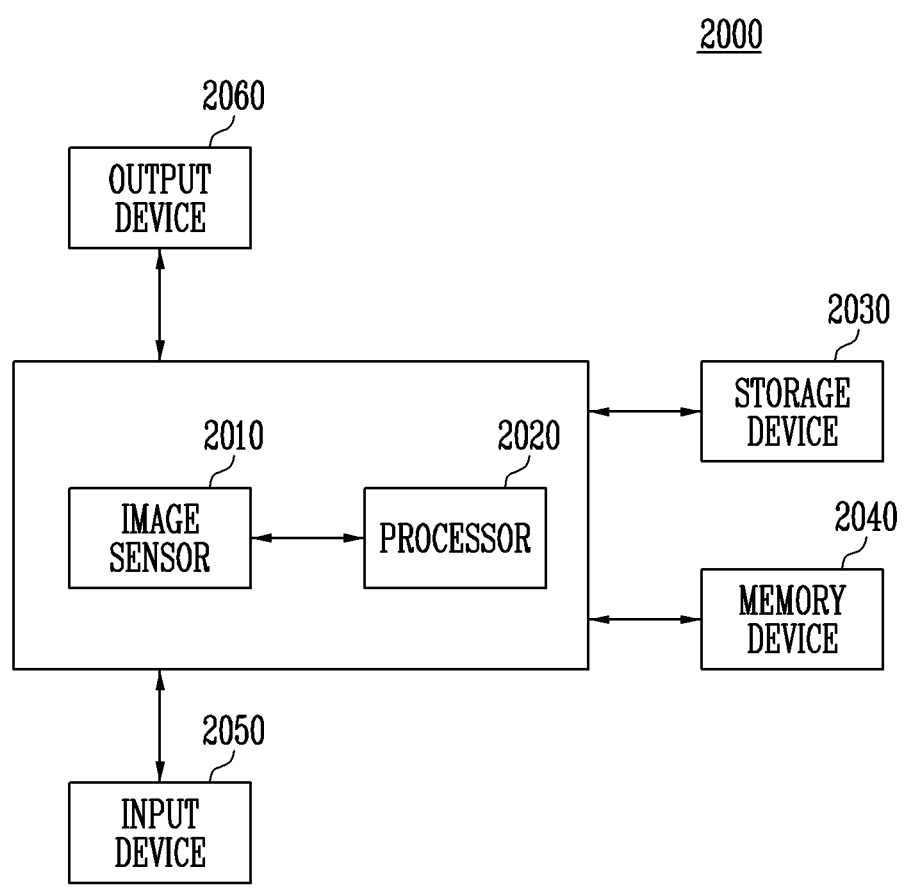
FIG. 10 is a block diagram illustrating an electronic device including an image sensor in accordance with an embodiment of the present disclosure.

FIG. 10 is a block diagram illustrating an electronic device including an image sensor in accordance with an embodiment of the present disclosure.

Referring to FIG. 10, the electronic device 2000 may include an image sensor 2010, a processor 2020, a storage device 2030, a memory device 2040, an input device 2050, and an output device 2060. Although not shown in FIG. 10, the electronic device 2000 may communicate with a video card, a memory card, a USB device, and the like, or further include ports capable of communicating with other electronic devices.

The image sensor 2010 may generate image data corresponding to incident light. The image data may be transferred to the processor 2020 to be processed by the processor 2020. The image sensor 2010 may generate image data regarding an object that is input (or captured) through a lens. The lens may include at least one lens forming an optical system.

The image sensor 2010 may include a plurality of pixels. The image sensor 2010 may generate a plurality of pixel values corresponding to a photographed image in the plurality of pixels. The plurality of pixel values that are generated in the image sensor 2010 may be transmitted to the processor 2020. That is, the image sensor 2010 may generate a plurality of pixel values corresponding to a single frame.

In an embodiment of the present disclosure, the image sensor 2010 may improve the accuracy of a control voltage that is input to a pixel. The image sensor 2010 may boost a control voltage that is generated in a voltage generator based on a comparison signal that is obtained by comparing the control voltage with a reference voltage. The image sensor 2010 may reduce the influence of an offset voltage of a comparator, which is included in the comparison signal. The image sensor 2010 may apply a ground voltage to the comparator and may store a feedback voltage corresponding to the offset voltage in a sampling capacitor. The image sensor 2010 may add up the offset voltage and the feedback voltage, corresponding to the application of the control voltage and the reference voltage, so that the influence of the offset voltage included in the comparison signal can be reduced. By adding up the offset voltage and the feedback voltage, the offset voltage included in the comparison signal may be decreased by a gain ratio of the comparator.

The output device 2060 may display the image data. The storage device 2030 may store the image data. The processor 2020 may control operations of the image sensor 2010, the output device 2060, and the storage device 2030.

The processor 2020 may be an image processing device that performs a calculation of processing image data that is received from the image sensor 2010 and outputs the processed image data. The processing may be Electronic Image Stabilization (EIS), interpolation, color tone correction, image quality correction, size adjustment, or the like.

The processor 2020 may be implemented as a chip independent from the image sensor 2010. For example, the processor 2020 may be implemented with a multi-chip package. In another embodiment of the present disclosure, the processor 2020 may be included as a portion of the image sensor 2010 to be implemented as one chip.

The processor 2020 may execute and control an operation of the electronic device 2000. In accordance with an embodiment of the present disclosure, the processor 2020 may be a microprocessor, a Central Processing Unit (CPU), or an Application Processor (AP). The processor 2020 may be connected to the storage device 2030, the memory device 2040, the input device 2050, and the output device 2060 through an address bus, a control bus, and a data bus, to perform communication.

The storage device 2030 may include a flash memory device, a Solid State Drive (SSD), a Hard Disk Drive (HDD), a CD-ROM, all types of nonvolatile memory devices, and the like.

The memory device 2040 may store data that is necessary for an operation of the electronic device 2000. For example, the memory device 2040 may include a volatile memory device, such as a Dynamic Random Access Memory (DRAM) or a Static Random Access Memory (SRAM) and a nonvolatile memory device, such as an Erasable Programmable Read-Only Memory (EPROM), an Electrically Erasable Programmable Read-Only Memory (EEPROM), or a flash memory device. The processor 2020 may control the image sensor 2010 and the output device 2060 by executing a command set that is stored in the memory device 2040.

The input device 2050 may include an input means, such as a keyboard, a keypad, or a mouse, and the output device 2060 may include an output means, such as a printer or a display.

The image sensor 2010 may be implemented with various types of packages. For example, components of at least a portion of the image sensor 2010 may be implemented by using packages, such as Package-on-Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi-Chip Package (MCP), Wafer-level Fabricated Package (WFP), and Wafer-level Processed Package (WSP).

Meanwhile, the electronic device 2000 may be interpreted as all computing systems that use the image sensor 2010. The electronic device 2000 may be implemented in the form of a packaged module, a component, or the like. For example, the electronic device 2000 may be implemented as a digital camera, a mobile device, a smart phone, a Personal Computer (PC), a tablet PC, a notebook computer, a Personal Digital Assistant (PDA), an Enterprise Digital Assistant (EDA), a Portable Multimedia Player (PMP), a wearable device, a black box, a robot, an autonomous vehicle, or the like.

In accordance with the present disclosure, an image sensor may be provided that reduces the influence on an offset voltage of a comparator, which is included in a comparison signal that is obtained by comparing a control voltage with a reference voltage, and supplies a control signal having high accuracy to the pixels based on the comparison signal.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image sensor comprising:
   a comparator comprising:
      a first capacitor that samples a control voltage for controlling a pixel;
      a second capacitor that samples a reference voltage corresponding to the control voltage;
      a first switch that adjusts a voltage that is applied to the first capacitor;
      a second switch that adjusts a voltage that is applied to the second capacitor;
      a first feedback switch that connects a first output terminal of the comparator to a first input terminal of the comparator; and
      a second feedback switch that connects a second output terminal of the comparator to a second input terminal of the comparator; and
      an amplifier configured to generate a comparison signal by comparing a voltage of the first capacitor and a voltage of the second capacitor;
   a controller configured to control the first switch and the second switch to apply a ground voltage to the first capacitor and the second capacitor, turn on the first feedback switch and the second feedback switch, and store a feedback voltage corresponding to an offset voltage of the comparator in the first capacitor and the second capacitor; and
   a voltage generator configured to boost the control voltage based on the comparison signal.

2. The image sensor of claim 1, wherein the comparator is configured to receive the offset voltage that is input through the first input terminal and the second input terminal and configured to output the feedback voltage through the first output terminal and the second output terminal.

3. The image sensor of claim 2, wherein the first capacitor and the second capacitor sample the feedback voltage.

4. The image sensor of claim 1, wherein the controller is configured to control the first switch such that the control voltage is applied to the first capacitor, control the second switch such that the reference voltage is applied to the second capacitor, and turn off the first feedback switch and the second feedback switch, and
   wherein the comparator is configured to generate the comparison signal based on the control voltage, the reference voltage, the feedback voltage, and the offset voltage.

5. The image sensor of claim 4, wherein the comparator is configured to receive a difference between the control voltage and the reference voltage and a sum of the feedback voltage and the offset voltage, which are input through the first input terminal and the second input terminal, and configured to output the comparison signal through the first output terminal and the second output terminal.

6. The image sensor of claim 5, wherein, based on a magnitude of a signal input to the first input terminal and the second input terminal, the controller is configured to control a time for which the comparison signal maintains a first logic value.

7. The image sensor of claim 6, wherein, corresponding to the time for which the comparison signal maintains the first logic value, the voltage generator is configured to boost the control voltage.

8. The image sensor of claim 4, wherein the controller reduces influence of the offset voltage of the comparator based on a sum of the feedback voltage and the offset voltage.

9. The image sensor of claim 8, wherein the comparator is configured to generate the comparison signal in which the influence of the offset voltage is reduced by a gain ratio of the comparator.

10. A comparator comprising:
    a capacitor set configured to sample a control voltage for controlling a pixel and a predetermined reference voltage;
    an amplifier configured to generate a comparison signal by comparing the voltages that are sampled by the capacitor set; and
    a switch set configured to adjust voltages that are applied to the capacitor set and control feedback of the amplifier,
    wherein the capacitor set is configured to store a feedback voltage corresponding to an offset voltage of the amplifier during a first period in which the comparison signal of the amplifier is fed back and configured to add up the feedback voltage and the offset voltage during a second period in which the control voltage and the reference voltage are applied to the amplifier.

11. The comparator of claim 10, wherein the capacitor set includes a first capacitor that samples the control voltage and a second capacitor that samples the reference voltage, and
    wherein the first capacitor and the second capacitor are configured to store the feedback voltage during the first period.

12. The comparator of claim 11, wherein the amplifier is configured to generate the comparison signal in which influence of the offset voltage is reduced by a gain ratio of the comparator based on a sum of the feedback voltage and the offset voltage during the second period.

13. The comparator of claim 11, wherein the switch set includes a first switch that adjusts a voltage that is applied to the first capacitor, a second switch that adjust a voltage that is applied to the second capacitor, a first feedback switch that connects a first output terminal of the comparator to a first input terminal of the comparator, and a second feedback switch that connects a second output terminal of the comparator to a second input terminal of the comparator,
    wherein the first switch and the second switch are configured to apply a ground voltage to the first capacitor and the second capacitor during the first period, and wherein the first feedback switch and the second feedback switch are turned on during the first period.

14. The comparator of claim 13, wherein, during the second period, the first switch is configured to apply the control voltage to the first capacitor, and the second switch is configured to apply the reference voltage to the second capacitor, and
wherein the first feedback switch and the second feedback switch are turned off during the second period.

15. The comparator of claim 14, wherein the amplifier is configured to receive a difference between the control voltage and the reference voltage and a sum of the feedback voltage and the offset voltage, which are input through the first input terminal and the second input terminal and configured to output the comparison signal through the first output terminal and the second output terminal.

16. The comparator of claim 13, wherein the amplifier is configured to receive the offset voltage that is input through the first input terminal and the second input terminal and configured to output the feedback voltage through the first output terminal and the second output terminal.

17. A method of operating an image sensor, the method comprising:
storing a feedback voltage corresponding to an offset voltage of a comparator in a first capacitor that samples a control voltage for controlling a pixel and a second capacitor that samples a reference voltage corresponding to the control voltage;
adding up the offset voltage and the feedback voltage, corresponding to an input of the control voltage and the reference voltage;
generating a comparison signal based on a difference between the control voltage and the reference voltage and a sum of the feedback voltage and the offset voltage; and
boosting the control voltage based on the comparison signal.

18. The method of claim 17, wherein the storing of the feedback voltage includes:
applying a ground voltage by controlling a first switch that adjusts a voltage that is applied to the first capacitor and a second switch that adjusts a voltage that is applied to the second capacitor;
turning on a first feedback switch that connects a first output terminal of the comparator to a first input terminal of the comparator and a second feedback switch that connects a second output terminal of the comparator to a second input terminal of the comparator; and
sampling the feedback voltage.

19. The method of claim 18, wherein the adding up of the offset voltage and the feedback voltage includes:
applying a control voltage to the first capacitor by controlling the first switch and applying a reference voltage to the second capacitor by controlling the second switch;
turning off the first feedback switch and the second feedback switch; and
storing an offset voltage that is decreased by a gain ratio of the comparator in the first capacitor and the second capacitor based on the offset voltage and the feedback voltage.

20. The method of claim 19, wherein the generating of the comparison signal includes:
sampling the control voltage;
sampling the reference voltage; and
outputting the comparison signal that maintains a first logic value for a boosting time that is determined based on a sum of the difference between the control voltage and the reference voltage and the decreased offset voltage that is stored in the first capacitor and the second capacitor.

21. The method of claim 20, wherein the boosting of the control voltage includes increasing the control voltage, corresponding to the boosting time.

* * * * *